Nov. 26, 1968

H. A. FROMSON 3,412,782

PROCESS OF PRODUCING CLAD SLABS

Filed July 12, 1967

INVENTOR
HOWARD A. FROMSON

BY *Burgess, Ryan · Hicks*
ATTORNEYS

United States Patent Office 3,412,782
Patented Nov. 26, 1968

3,412,782
PROCESS OF PRODUCING CLAD SLABS
Howard A. Fromson, Rogues Ridge Road,
Weston, Conn. 06880
Continuation-in-part of application Ser. No. 412,448,
Nov. 19, 1964. This application July 12, 1967, Ser.
No. 652,871
10 Claims. (Cl. 164—98)

ABSTRACT OF THE DISCLOSURE

The invention resides in a process of casting a clad slab in a tiltable unit comprising a mold and a reservoir, connected together and turntable about an axis from an elevated position through an angle of 90° or less, to a horizontal casting position. The mold has a mold cavity with an effective length greater than its effective depth. The basic material for forming the basic slab is teemed in the reservoir, while the unit is in initial elevated position, with the reservoir on the bottom and the mold above it. The unit is then turned about an axis to a casting position in which the mold is horizontal, the base material being transferred to the mold during this turning operation. The base material is permitted to solidify in the mold while the unit is in casting position to produce the clad slab. The unit is then turned about its axis back into elevated position, the reservoir is filled with fused clad material and the unit is returned to casting position. During this last operation the clad material is transferred from the reservoir to the mold and forms a layer on the base slab, which is solidified to form a lining on said slab.

The present invention relates to a process of casting laminated or clad plates or slabs. The application is a continuation-in-part of copending application Serial No. 412,448 filed November 19, 1964.

The aforesaid copending application discloses a process in which a combined reservoir and mold forming an integrated unit, has applied thereto a fusible mold or retaining material. This fusible mold material has a specific gravity lower than that of the material to be cast, as for example ferrous metal, and therefore, forms a liquid layer which floats on the surface of the fused material to be cast contained in the reservoir. While the material to be cast is in the reservoir, it is covered by the fused layer of mold material. Casting is effected by tilting the reservoir-mold unit through an angle to cause the liquid material to be cast to pass from the reservoir to the mold. During this transfer operation, the fused layer of mold material flows ahead of the material to be cast, to line the mold, so that the fused material to be cast, transferred to the mold, will be encompassed by the fusible mold material. The excess mold material forms a liquid layer, which floats on the surface of the material being cast, thereby improving the surface quality of the casting and effecting other benefits described in the aforesaid application.

Metal shrinks about 4% when transformed from liquid to solid state. In the conventional process of making an ingot, the mold in casting position is upright with its greatest areal dimension vertical. Shrinking of the metal in the form of an ingot during casting operations results in the formation of a cavity at the top of the ingot. If this ingot were rolled by application of rolling pressure against its longitudinal sides without cropping the shrinkage portion from the top of the casting, the casting would split and "fish-tail." To avoid this, it would be necessary to crop the cavity section of the ingot before rolling.

In accordance with the invention disclosed in the aforesaid application, in order to avoid the adverse conditions described, the mold has a mold cavity shaped to form a plate or slab, and the combined reservoir and mold are arranged and constructed to turn about an axis as a unit substantially less than 180° and preferably 90° or less, from an initial elevated position in which the material to cast is deposited in the reservoir to a final casting position in which the material to be cast has been transferred to the mold. The slab or plate is cooled and cast in the mold while the greatest areal dimension of the body of material being cast is horizontal and desirably at the top. Therefore, any shrinkage cavity formed on the top surface is distributed throughout a comparatively large area, and is almost insignificant, when spread so thinly and widely throughout this area. Moreover, since rolling pressure is applied to the faces of the slab presenting such comparatively large areas, whatever irregularities there may be on the surfaces due to shrinkage are rolled out. Therefore, no cropping is necessary and 100% recovery retained.

On object of the present invention is to provide a new and improved process of producing a laminated or clad plate or slab by an apparatus similar to that disclosed in the aforesaid copending application and in certain aspects similarly operated.

In carrying out the objectives of the present invention, the base slab or plate, made for example, of ferrous metal, is produced in accordance with the principles set forth in the aforesaid copending application. However, instead of taking the slab out of the mold after it has been cast, the reservoir-mold unit with the cast slab retained in its mold is tilted from casting position back into its initial elevated position, clad material is deposited in the reservoir in molten form, and the unit is tilted back into casting position. During this second tilting operation of the unit towards casting position, the clad material flows from the reservoir to the mold to form a layer over the previously cast base slab or plate. This layer of clad material, when solidified on the top surface of the base slab or plate, is integrally bonded to this base slab or plate, especially after the composite slab has been rolled. The component layers in the finally rolled composite slab will be integrally joined together and free from intervening salts or oxides.

Other objects, features and advantages of the present invention are apparent from the following description and from the accompanying drawings, in which FIG. 1 is a top plan view of an apparatus, which comprises a reservoir and a mold connected together for tilting movement in unison, and which can be employed to carry out the process of the present invention;

Figure 1:
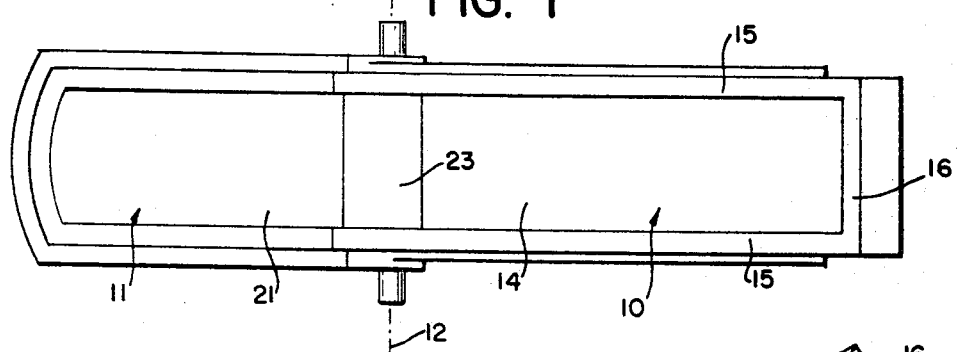
Figure 2:
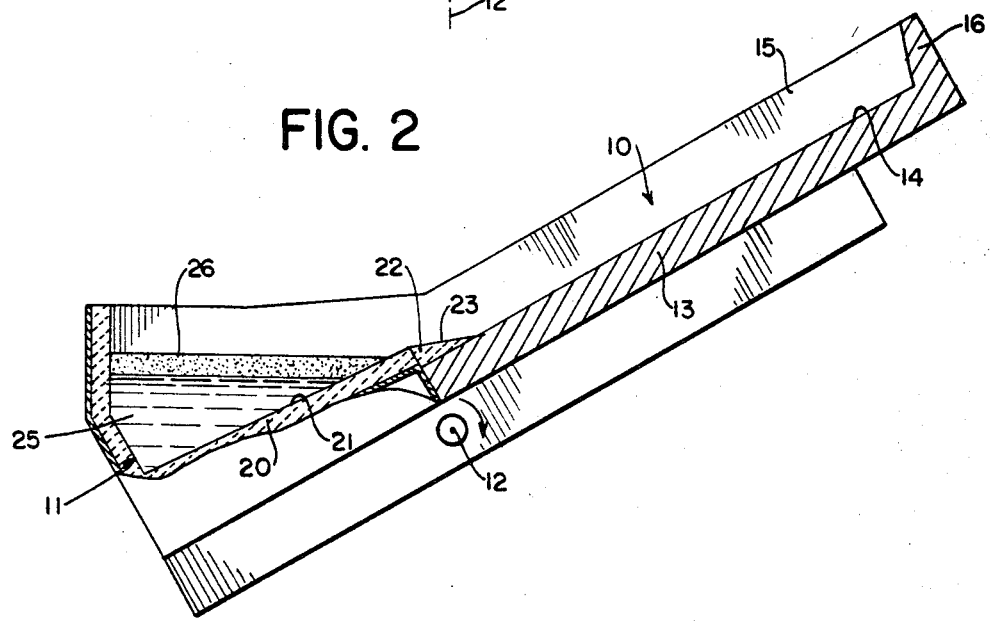
FIG. 2 is a vertical longitudinal section through the center of the apparatus, shown in initial elevated position just after the fused base material to be cast has been teemed into the reservoir and has been covered with a layer of mold material, and just before the apparatus has been tilted into horizontal casting position to cast the base slab.
Figure 3:
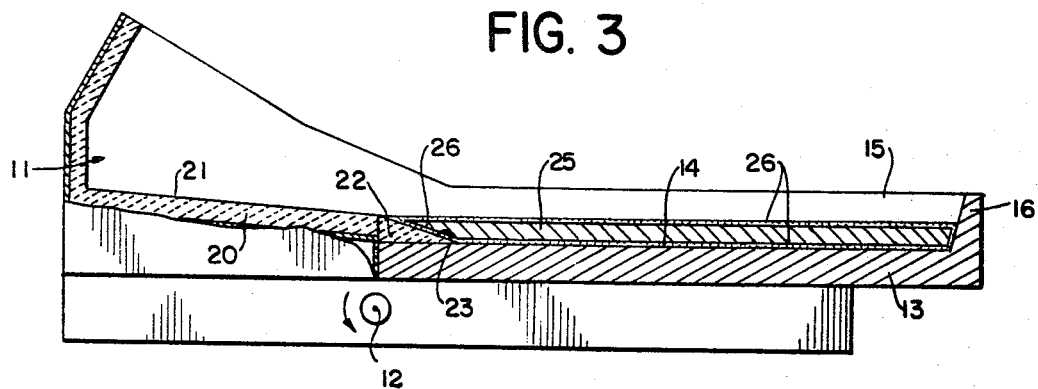
FIG. 3 is a section of the apparatus similar to that indicated in FIG. 2, but shown in horizontal casting position in which the base material to be cast has been transferred from the reservoir to the mold, and the base material has solidified in to a base slab.
Figure 4:
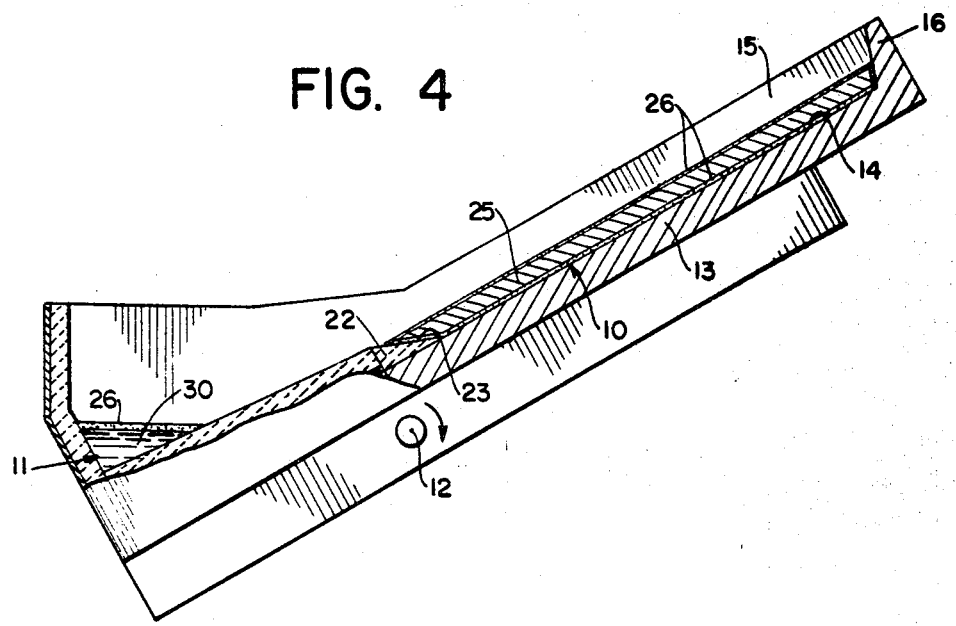
Figure 5:
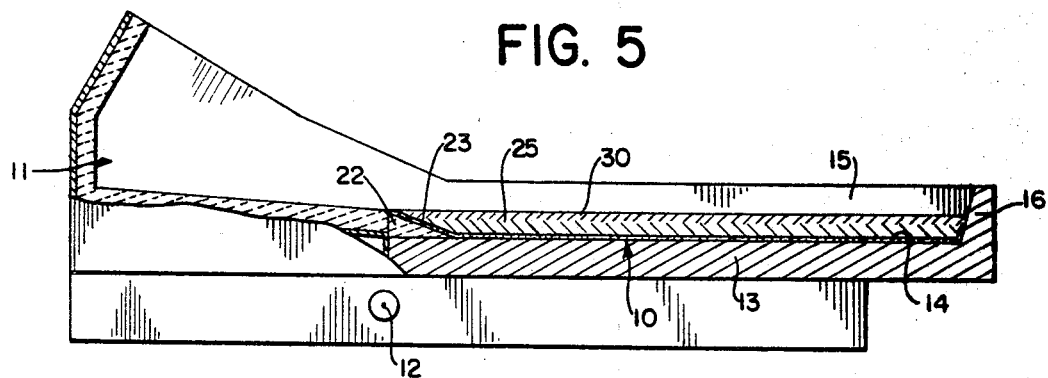

FIG. 4 is a section of the apparatus similar to that indicated in FIG. 2, and shown tilted back to its elevated initial position, while the mold retains the cast base slab, and after the fused clad material has been deposited in the reservoir; and FIG. 5 is a section of the apparatus similar to that indicated in FIG. 3, and shown tilted from the initial elevational position shown in FIG. 4 back to casting position again, and after the clad material has been transferred to the mold by this tilting operation and spread over the cast base slab to form a lining therefor.

Referring to the drawings, there is shown a reservoir-mold unit with a section 10 at one end, serving as a mold, and a reservoir 11 at the other end. The reservoir-mold unit is arranged to be tilted 90° or less, about an axis 12 from initial teeming position shown in FIG. 2 to horizontal casting position shown in FIG. 3. In the specific form of apparatus shown, the angle of tilt is about 30°.

The mold 10 has a mold cavity which is slab shape, and comprises a bottom wall 13 presenting a supporting surface 14, side walls 15 and an end wall 16; the mold 10 is open at the top.

The reservoir 11 has a bottom wall 20 presenting a supporting surface 21 almost parallel to the supporting surface 14 of the mold 10 but at a higher elevation. This reservoir wall 20 connects at its end nearest the mold 10 to a wall piece 22 with a sloping surface 23 interconnecting the two surfaces 21 and 14, to afford smooth transfer of molten metal from the reservoir 11 to the mold 10, with minimum of turbulence, as the mold-reservoir unit is tilted clockwise about the axis 12 from the position shown in FIG. 2 to the casting position shown in FIG. 3. This wall piece 22 serves as an end wall for the mold 10 in horizontal casting position shown in FIG. 3.

At the beginning of operations, the reservoir-mold unit is in the initial tilted elevated position shown in FIG. 2, with the reservoir 11 in the lowermost position and in empty condition. In this position of the reservoir-mold unit, the base material 25 to be cast, which is desirably fused metal, and which could, for example, be a carbon steel, is introduced into the empty reservoir 11, and then a layer of fusible mold material 26 is deposited on the surface of this base material 25. This mold material 26 (1) is immiscible with the molten material to be cast, (2) is in liquid form or becomes liquid by contact with the hot base material 25 to be cast, and (3) is of density lower than that of the base material 25 to be cast, so that it will float on the surface of this base material. If desired, this mold material 26 can be introduced into the reservoir 11, while this reservoir is empty and the molten base material 25 to be cast can be poured into the reservoir over the layer of mold material 26. The fused mold material 26 will rise to the surface of the base material 25 to be cast and will float thereon. However, because of the tapering shape of the reservoir 11, the better expedient is to apply the mold material 26 to the base material 25 to be cast, after the latter material has been deposited in the reservoir.

The particular fusible mold material 26 which is employed in accordance with the present invention is determined by the characteristics of the base material to be cast. In any case, it must have the following characteristics:

(1) A solidification temperature lower than that of the base material 25 being cast.

(2) A thermal conductivity which is low relative to the thermal conductivity of the solid wall material of the mold 10.

(3) Immiscibility when in the fused state with the base material 25 being cast.

(4) Non-volatility or low volatility at the maximum temperature to which it is heated during the casting operation.

(5) Chemical non-reactivity with the base material 25 being cast and with the wall material of the mold 10.

It has been found in accordance with the present invention that inorganic salts, mixtures of inorganic salts, inorganic oxides and mixtures of inorganic oxides are generally suitable compounds from which to select a satisfactory mold material. Examples of salts which may be used are barium chloride, barium fluoride, cadmium fluoride, calcium chloride, calcium fluoride, copper chloride, lead chloride, lead fluoride, lithium bromide, lithium chloride, magnesium chloride, magnesium fluoride, potassium bromide, potassium chloride, potassium fluoride, silicon oxide, silver chloride, sodium chloride, sodium cyanide, cryolite (sodium aluminum fluoride) borax, or mixtures thereof.

It has been made apparent from the foregoing discussion that the essential requirements of the present invention is that the fusible mold material 26 with its melting point below the solidification of the base material 25 to be cast must be adequately cooled by the solid walls of the mold 10 so that the temperature of the interface between the fusible mold material 26 and the solid supporting surface of the mold wall will never, for any reason, reach the melting point of the fusible mold material 26.

Any solid material having high thermal conductivity and good structural strength is suitable for use as the backing solid for the mold 10. The mold walls in accordance with the present invention may comprise a backing solid having a high capacity to absorb heat, as well as high thermal conductivity, this capacity being present in amount to absorb the total heat of fusion of the base material 25 being cast together with any super heat carried thereby, while maintaining its solid supporting surface in contact with the fusible mold material 26, below the melting point of this mold material. This form of mold has no provision for forced cooling, as by means of a circulating coolant.

An alternative form of mold is provided with means for force cooling the mold 10, as for example, by means of cooling pipes or ducts for fluid coolant, embedded or located in the solid walls of said mold. The solid parts of the mold wall would still be of higher thermal conductivity than the fusible mold material 26, but it need not have high heat capacity. The forced cooling capacity of the solid parts of the mold walls must be adequate to remove heat from the backing solid at a rate which keeps its solid supporting surface below its own melting point and below that the mold material 26 in contact with said supporting surface.

The structural metals are generally suitable for use as the solid parts of the mold wall where forced cooling is employed. In the form of mold illustrated, where no means for forced cooling is provided, the particular metal used must be selected in view of the thermo-dynamic characteristics of the base material 25 which is cast in the mold 10 and of the casting operation itself. Cooper, the various alloys of cooper, aluminum and aluminum alloys, silver and silver alloys, steel and cast iron are particularly suitable for this purpose, because of their relatively high thermal conductivity, high capacity to absorb heat, and good structural characteristics. Graphite is also a suitable material for the backing solid of the mold 10 and can be used even in the casting of the steel, since the fusible mold material 26 prevents the steel from picking up the graphite. It has been found in accordance with the present invention that copper and its various alloys are widely useful as the backing solid of the mold.

The walls of the reservoir 11 desirably should not be of high thermal conductivity, where it is intended to maintain the material in the reservoir for any period of time, as for example, to permit it to settle into a quiescent state before transfer to the mold 10, since such delay in transfer operations would initiate solidification in the part of the reservoir-mold unit not desired. For that purpose, the walls of the reservoir 11 may be made of refractory material having low thermal conductivity, or of cast steel with a refractory lining as shown. Due to the low heat conductivity of the refractory material on the walls of the reservoir 11, the mold material 26 does not solidify thereon.

In carrying out the process of the present invention, the reservoir-mold unit, set up in the condition and in the initial tilted position shown in FIG. 2, is turned clockwise, about the pivot axis 12 into the horizontal casting position shown in FIG. 3. The angle that the reservoir-mold unit is turned between the positions of FIG. 2 and FIG. 3 is about 30° in the specific embodiment of the invention shown in the drawings. This tilt is effected slowly to prevent undue turbulence in the materials being transferred, and in a specific form may take a minimum of about nine seconds. During this tilting movement of the reservoir-mold unit, the base material 25 to be cast is transferred from the reservoir 11 to the mold 10, but during this transfer, the layer of liquid mold material 26 flowing in advance of the base material 25 to be cast, lines the walls of the mold. When the reservoir-mold unit reaches the final horizontal casting position shown in FIG. 3, there is formed in the mold 10 a body of base material 25 to be cast, in the form of a slab, and this body of base material will be surrounded on all sides including the top horizontal surface with a layer of the mold material 26. In this casting position, the base material 25 to be cast is permitted to solidify under the protective and beneficial action of the blanketing mold material 26, so that the surface of the body of base material does not oxidize.

It may be desirable to cover the mold 10 with an insulating heat shield while the base material 25 is solidifying therein in the position of the reservoir-mold unit shown in FIG. 3, to inhibit or control heat radiation from the upper surface of the body of base material, in case the upper section of this body is solidifying at too fast a rate in comparison with the rate of solidification of the lower section. Without a heat shield, the upper section of this body of base material 25 may solidify so much faster than the bottom section, that the upper surface of this body may be too cool to form a good bond with the clad material 30 when a layer of this clad material is subsequently laid on the cast base slab. If such a heat shield is used, it is desirable to use it during only part of the solidification phase of the base material 25.

After the base material 25 is solidified in the mold 10 in the form of a slab, as shown in FIG. 3, but desirably while the upper surface of the slab is still at a temperature above the melting point of the mold material 26, the reservoir-mold unit is tilted back counterclockwise about the axis 12 into the inclined elevated position shown in FIG. 4, which is the same position as the initial position shown in FIG. 2. With the reservoir-mold unit in the elevated position shown in FIG. 4, molten clad material 30 is deposited in the reservoir 11. Although the base slab in the mold 10 at this stage is solidified, its upper surface is still desirably at a temperature above the melting point of the mold material 26, so that some of this mold material in liquid form on this surface will flow downwardly along said surface into the reservoir 11, as the reservoir-mold unit is tilted back counterclockwise from the position shown in FIG. 3 to the position shown in FIG. 4. Some of this mold material 26 will be retained on the upper surface of the solidified base slab and will continue to protect this slab surface against oxidation. The mold material 26 returned to the reservoir 11 will rise to the surface of the clad material 30 deposited in the reservoir over said mold material. No additional mold material 26 need be added to the reservoir 11, and if none of the mold material is returned from the mold 10 to the reservoir 11 for the clad material 30, this does not affect the process or the results attained to any significant extent, especially in view of the fact that the amount of clad material 30 is comparatively small and forms a lining on the base slab, which is thin compared with the thickness of this slab.

The clad material 30, of course, has a composition different from that of the base material 25. For example, if the base material 25 is carbon steel, the clad material 30 may be stainless steel or a different grade of carbon steel, or may be copper or nickel, or an alloy of copper and nickel, or titanium, or an alloy thereof, or an alloy of chromium, or any other material suitable for cladding purposes.

After the clad material 30 has been deposited in the reservoir 11 in elevated position of the reservoir-mold unit shown in FIG. 4, the unit is again tilted clockwise about the axis 12 from the position shown in FIG. 4 back to the casting position shown in FIG. 5, corresponding to the casting position shown in FIG. 3. During this return movement of the reservoir-mold unit back to casting position shown in FIG. 5, the clad material 30 flows from the reservoir 11 and along the upper surface of the cast base slab 25 in the mold 10 to form a thin layer on said base slab. During this transfer movement, the thin film of mold material 26 adhering to the upper surface of the cast base slab 25, and protecting it against oxidation, is washed away by the clad material 30 as it flows over this base slab, and the mold material so removed rises to the surface of the clad material 30 collected as a layer on the surface of the base slab. This clad material 30 fuses to the upper surface of the base slab 25, and there is thereby produced a firm bond between the clad lining 30 and the base slab 25 upon solidification of this lining, free from salts or oxides therebetween. If this thin layer of mold material 26 is not substantial enough to protect the surface of the cast base slab 25 against oxidation before the clad material 30 is poured over said slab, the cast slab in the interval between the phase when it has been solidified in position of the mold shown in FIG. 3, and the phase when the mold has been tilted back to position shown in FIG. 5, may be maintained under an inert or reducing atmosphere to prevent such oxidation.

An insulating heat shield may cover the mold 10 during part of the solidification phase of the clad material 30 to inhibit or control heat radiation from the upper surface of the layer of clad material, while it is solidifying, to control the solidification and crystallization pattern developed.

The mold 10 has an effective length substantially greater than its effective depth, so that in casting position shown in FIG. 3, the top horizontal surface of the body of base material 25 being cast extends along the length of the mold and constitutes the base slab surface presenting the largest area, and the depth of the mold for that particular casting operation is vertically downward from said horizontal surface. Consequently, the shrinkage pattern is such as to produce a good surface on the base slab 25 for cladding without cropping. Similarly, the upper surface of the clad lining 30 formed on the base slab 25 will be substantially free from shrinkage defects, and what little surface defects there are can be easily and effectively rolled out of existence. When the composite casting 25, 30 is rolled, the two component layers become more intimately bonded together, so that integral joining of the two layers is assured.

The operation of producing the slab 25 described, with a mold 10 having a slab-like cavity, and forming part of a reservoir-mold unit, tiltable through an angle of 90° or less from initial position shown in FIG. 2 to casting position shown in FIG. 3, has other advantages besides those enumerated. For example, it is easy to control the thickness of the base slab 25 and the thickness of the clad lining 30 with the same unit by merely controlling the amount of base material and clad material employed.

Moreover, with the combined reservoir and mold unit described. since the unit is tilted less than 180° and preferably 90° or less, it is not necessary to provide a pit below the floor level to receive the mold in its final casting stage.

Also, with a tilt of 90° or less for the unit described, the molten metal or other material being cast flows from the reservoir 11 to the mold 10 during the entire tilting movements along an upwardly extending wall, so that transfer of material to be cast from the reservoir to the mold is effected with minimum of agitation and creation of waves in this material.

The fusible mold material 26 applied in the manner described provides lubrication to mold-casting interface, thereby reducing the shear forces associated with differential thermal contraction of the casting and expansion of the mold.

Also, the fusible mold material 26 performs two important thermal functions in the casting of the base slab 25

(a) The initial rate of heat transfer from the material 25 to be cast to the solid backing material of the mold 10 is less than would be the case if the fusible mold material 26 were not present. This significantly extends the life of the solid backing material of the mold 10.

(b) Heat transfer during the later stages of solidification of the base slab 25 is greater than would be the case if no fusible mold material 26 were used, because the liquid part of the mold form defined by this mold material maintains intimate wetted contact between the casting and the mold (i.e. there is no air gap). This results in increased solidification and higher production rates.

The presence of a substantial quantity of fused mold material 26, which is immiscible with and of lower density than the material 25 being cast, floating on the material being cast, inhibits any tendency toward uncontrolled flow of the material being cast, as the unit is tilted from initial position shown in FIG. 2 to final casting position shown in FIG. 3.

While the invention has been described with particular reference to a specific embodiment, it is to be understood that it is not to be limited thereto but is to be construed broadly and restricted solely by the scope of the appended claims.

What is claimed is:

1. The method of casting a laminated sheet made of two superimposed layers of different composition in a mold forming with a reservoir a unit, in which said mold and said reservoir are on opposite ends and are interconnected with a wall having a transfer surface interconnecting internal surfaces of said mold and said reservoir, said unit being tiltable about an axis from an initial position to a casting position, said unit in initial position having a reservoir so elevationally related to the mold that material in molten form in said reservoir will not flow along said transfer surface to said mold in said initial position but as the unit is tilted towards casting position, the material flows from said reservoir along said transfer surface to said mold, said mold in casting position having its length horizontal and its depth downward and substantially less than its length, whereby a body of material when cast in the mold in casting position will have a surface of greatest areal dimension extending substantially horizontal, said method comprising the steps of depositing base material in molten form in said reservoir while said unit is in said initial position, turning said unit about said axis from said initial position to said casting position to transfer said molten base material from said reservoir along said transfer surface to said mold, said mold remaining in said casting position until the base material therein solidifies to form a base slab, tiltably returning said unit about said axis back to said initial position while the solidified base slab is in said mold, depositing clad material having a composition different from that of the base material in molten form in said reservoir while in said initial returned position, returning said unit about said axis from said initial position back to casting position to cause said clad material to be transferred from said reservoir along said transfer surface to said mold and to be deposited as a layer over the solidified cast slab, while said cast slab is hot enough to cause said clad material to be integrally bonded to the cast base slab, and permitting said clad material to solidify on said base slab as a clad layer while said mold is in said casting position.

2. The method of casting a laminated sheet made up of a base layer and a clad layer of different composition bonded thereto in a mold forming with a reservoir a unit, in which said mold and said reservoir are on opposite ends and are interconnected with a wall having a transfer surface interconnecting internal surfaces of said mold and said reservoir, said unit being tiltable about an axis from initial position to a casting position, said unit in initial position having a reservoir so elevationally related to the mold that material in molten form in said reservoir will not flow along said transfer surface to said mold in said initial position but as the unit is tilted towards casting position, the material flows from said reservoir along said transfer surface to said mold, said mold in casting position having its length horizontal and its depth downward and substantially less than its length, whereby a body of material when cast in the mold will have a surface of the greatest areal dimension extending substantially horizontal, said method comprising the steps of depositing base material in molten form in said reservoir while said unit is in said initial position, turning said unit about said axis from said initial position to said casting position to transfer said molten base material from said reservoir along said transfer surface to said mold, said mold remaining in said casting position until said base material therein solidifies to form a base slab, depositing a layer of clad material having a composition different from that of said base material on the cast base slab while said cast base slab is still in said mold in said casting position and while said cast slab is hot enough to cause said clad material to be integrally bonded to the cast base slab, and permitting said clad material to solidify on said base slab as a clad layer while said mold is in said casting position.

3. The method of casting a laminated sheet made up of a base layer and a clad layer of different composition bonded thereto in a mold forming with a reservoir a unit, in which said mold and said reservoir are on opposite ends and are interconnected with a wall having a transfer surface interconnecting internal surfaces of said mold and said reservoir, said unit being tiltable about an axis from a non-casting position to a casting position, said unit in non-casting position having a reservoir so elevationally related to the mold that material in molten form in said reservoir will not flow along said transfer surface to said mold in said non-casting position but as the unit is tilted towards casting position, the material flows from said reservoir along said transfer surface to said mold, said mold in casting position having its length horizontal and its depth downward and substantially less than its length, whereby a body of material when cast in the mold will have a surface of the greatest areal dimension extending substantially horizontal, said method comprising the steps of casting a base slab of base material in the mold while said mold is in casting position to form said base layer, tilting said unit about said axis to said non-casting position while the solidified base slab is in said mold, depositing clad material having a composition different from that of the base material in molten form in said reservoir while in said non-casting position, returning said unit about said axis from said non-casting position back to casting position to cause said clad material to be transferred from said reservoir along said transfer surface to said mold and to be deposited as a layer over the solidified cast slab while said cast slab is hot enough to cause said clad material to be integrally bonded to the cast base slab, and permitting said clad material to solidify on said base slab as a clad layer while said mold is in said casting position.

4. The method according to claim 1, said molten base material to be cast being deposited and collected in said reservoir while said unit is for the first time in elevated initial position, with a layer of fusible mold material floating on the top surface thereof and having (1) a solidification temperature lower than that of the base material to be cast, (2) a thermal conductivity less than that of the wall of the mold defining its mold cavity, (3) immiscibility with the base material to be cast when said mold material is in fused state, (4) low volatility at the maximum temperature to which the mold material will be subjected during the casting of the base material, (5) chemical non-reactivity with the material being cast and with the wall of the mold defining its mold cavity, and (6) a specific gravity when fused less than that of the molten base material to be cast, said molten base material during the first turning operation being transferred to the mold with the floating layer of mold material flowing in advance of the molten base material to line the inner surfaces of said mold before the molten base material reaches said mold, whereby there is formed between said mold surfaces and the molten base material in said mold a layer of said mold material.

5. The method according to claim 4, said reservoir mold unit being turnable from initial elevated position to casting position angularly through an angle of about 30°.

6. The method according to claim 1, wherein the base material and the clad material are both metal.

7. The method according to claim 1, wherein the base material is a carbon steel, and the clad material is a metal of the class consisting of carbon steel, stainless steel, copper, nickel, titanium, chromium, and alloys of copper, nickel, titanium and chromium.

8. The method according to claim 4, wherein the base material and the clad material are both metal.

9. The method according to claim 4, wherein the base material is carbon steel, and the clad material is of metal.

10. The method according to claim 4, wherein said mold material is of the class consisting of barium chloride, barium fluoride, cadmium fluoride, calcium chloride, calcium fluoride, copper chloride, lead chloride, lead fluoride, lithium bromide, lithium chloride, magnesium chloride, magnesium fluoride, potassium bromide, potassium chloride, potassium fluoride, silicon oxide, silver chloride, sodium chloride, sodium cyanide, borax and mixtures thereof.

References Cited

UNITED STATES PATENTS

| | | | |
|---|---|---|---|
| 2,136,840 | 11/1938 | Buckler | 164—136 |
| 1,189,548 | 7/1916 | Durville | 164—136 |
| 3,333,625 | 8/1967 | Fromson | 164—136 |
| 2,249,417 | 7/1941 | Chace | 164—136 |
| 2,193,246 | 3/1940 | Chace | 164 |
| 2,515,191 | 7/1950 | Carpenter | 164 |

FOREIGN PATENTS 20,895  12/1890  Great Britain.

J. SPENCER OVERHOLSER, *Primary Examiner.*

V. K. RISING, *Assistant Examiner.*